3,177,383
CONDUCTIVE FLUID RESOLVER
William L. Carlson, Jr., Bloomington, Minn., assignor to Honeywell Inc., a corporation of Delaware
Filed Sept. 20, 1961, Ser. No. 139,471
6 Claims. (Cl. 310—11)

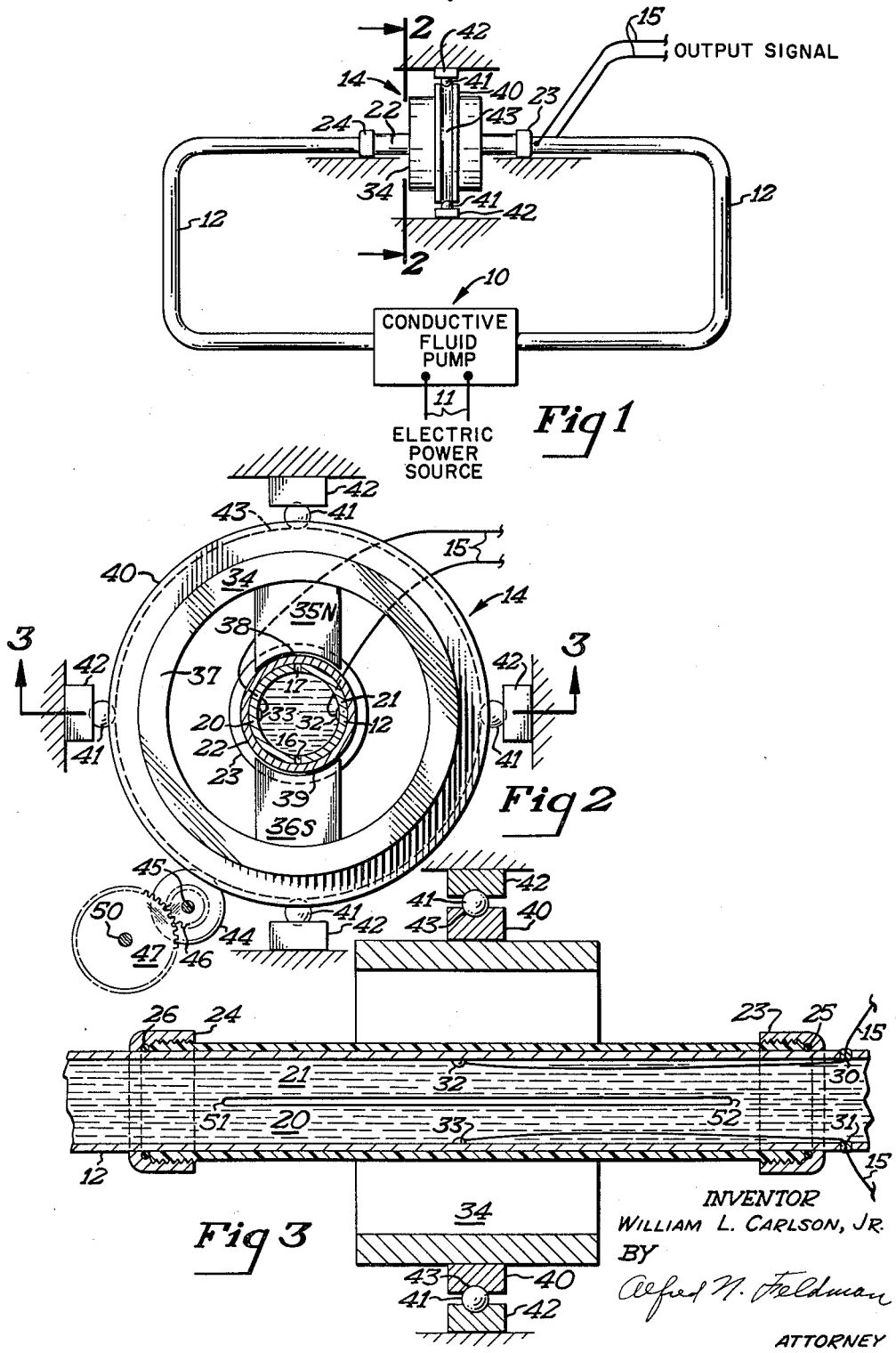

The present invention is directed to a resolving device capable of sensing rotation, and more particularly is directed to a conductive fluid filled device that utilizes the concept that an electric current is generated in a conductive fluid when the fluid is subjected to mutually perpendicular magnetic fields and fluid flow.

It has long been known that an electromagnetic conductive fluid pump can be formed wherein a conductive fluid is caused to flow by an electric current and a magnetic field angularly disposed to each other and to the direction of flow of the fluid. This principle was recognized by Faraday. The basic principle has been applied to many types of devices such as pumps, flowmeters, and, in some cases, generating devices wherein a constant magnetic field is mutually perpendicular to a flowing conductive fluid and a pair of electrodes. The present invention is directed to the utilization of these well-known principles in a specific device to yield a resolver that is capable of sensing a rotational angle and which has no restoring torque generated by the rotation of the device.

It is a primary object of the present invention to disclose a conductive fluid resolver that utilizes a flowing conductive fluid in a system that contains two fixed electrodes and a rotatable magnetic field wherein a variable output signal is generated by the relative rotation of the field to the electrode structure.

It is another object of the present invention to disclose a closed fluid system that is capable of generating an electrical output that is related to the position of one of the elements and which varies in a sinusoidal fashion.

Yet another object of the present device is to disclose a mechanical resolver that is capable of sensing a rotational position and which has no restoring torque generated when the resolver is utilized.

These and other objects will become apparent when the device is fully considered in the light of the present specification and drawing, wherein:

FIGURE 1 is a schematic representation of a typical system including the resolver and the pump means for circulating a conductive fluid;

FIGURE 2 is a cross section along lines 2—2 of the resolver disclosed in FIGURE 1, and;

FIGURE 3 is a cross section of the resolver in a plane perpendicular to that of FIGURE 2 and taken along lines 3—3 of FIGURE 2.

The over-all system of FIGURE 1 includes a pump means 10 that has been disclosed as a conductive fluid pump. The pump means 10 can be of any type, but the use of an electromagnetic conductive fluid pump having no moving parts simplifies the over-all construction. The conductive fluid pump 10 is supplied by an electric power source shown connected to conductors 11 and the pump operates into a closed pipe system 12. A conductive fluid resolver is shown generally in elevation at 14 and forms the closing link in the conductive fluid system. The resolver 14 has an electrical output signal on a pair of conductors designated as 15.

The fluid system is filled with a conductive fluid, and can be considered such a fluid as mercury or an alloy of sodium and potassium commonly referred to as NaK. The conductive fluid is continuously pumped by the pump means 10 through the system and in most applications would be flowing at a constant rate. In order to obtain the constant even flow of the conductive fluid, the conductive fluid pump means 10 would be normaly be of the electromagnetic conductive fluid type as opposed to a piston pump or circulator type pump that uses a mechanical pumping action.

In FIGURE 2 an elevation along the line 2—2 of FIGURE 1 is disclosed wherein the resolver 14 is shown in detail. The output wires 15 are shown connected to the resolver and will be described in some detail after the present description. The pipe 12 is shown split at 16 and 17 to provide two electrodes 20 and 21 formed as two opposite walls of the pipe 12. The splits 16 and 17 in the pipe 12 form the electrodes 20 and 21 to provide two semicircular electrode surfaces when viewed in cross section. The section of pipe 12 where the splits 16 and 17 occur is encased in an insulating material 22 in the form of a sleeve, that provides a fluid seal so that none of the fluid contained in the system can leak to the atmosphere.

The details of the sleeve 22 can be more fully understood when the cross section of FIGURE 3 is considered. The insulating sleeve 22 extends beyond the splits 16 and 17 and is sealed by a pair of cap members 23 and 24 along with a pair of O-rings 25 and 26. The O-rings fit tightly about the pipe 12 and the cap members 23 and 24 are screwed down or otherwise appropriately sealed to the insulating tube 22. The insulating tube 22 could readily be made of glass or a ceramic and provide a hermetic seal so that the slots 16 and 17 would not leak any of the conductive fluid contained in the device. The wires 15 can be seen passing through insulated seals 30 and 31 and being attached at 32 and 33 to the electrodes 21 and 20, respectively. The wires 15 thus provide electrical connections to the electrodes 20 and 21 so that any potential generated between these electrodes can be brought out as an electrical output signal for a resolver.

Returning to FIGURE 2, it will be noted that the resolver has a magnetic structure 34 that is made up of a pair of permanent magnet pole pieces 35 aind 36 that project inwardly from a yoke 37. The yoke 37 is made of a good magnetic material and in turn supports a bearing race 40 that is used to support the magnetic structure 34. The pole pieces 35 and 36 are rounded at 38 and 39 so that they maintain a uniform air gap around the insulating tube 22 and provide a magnetic field across the tube 12. In the position disclosed in FIGURE 2, a magnetic field would exist at right angles to the electrodes 20 and 21 and this magnetic field would be mutually perpendicular to the electrodes and the direction of flow of the conductive fluid contained in the system. As such, an electrical potential would be generated between the electrodes 20 and 21 and would be available on the conductors 15.

Four ball bearings 41 and four bearing blocks 42 are disclosed supporting the magnetic structure 34 by rolling in the race 40 in a groove 43. The bearing blocks 42 are supported by appropriate structure so that the ball bearings 41 roll in the slot 43 of the race 40 thereby allowing the magnetic structure 34 to rotate with the center of the pipe 12 as the center of rotation. With this arrangement it is possible to freely rotate the magnetic structure 34 around the electrode structure 20 and 21 thereby changing the angle at which the magnetic field from the poles 35 and 36 cross the electrodes. If the magnetic structure 34 were rotated to a position where the magnetic field from the poles 35 and 36 crossed the electrodes 20 and 21 at right angles to the slots 16 and 17, there would be no electrical output from the conductors 15 as there would be no angular difference between the electrode center and the center of the magnetic field.

The output of the resolver 14 is a function of the position of the magnetic field between the poles 35 and 36 as long as the rate of flow of the conductive fluid in pipe 12 remains constant. As such, as the magnetic structure 34 is rotated about the pipe 12, the output of the resolver on conductors 15 will vary from a maximum in the position shown, to a minimum when the magnetic structure has been rotated 90 degrees. The output would then begin to increase again as the structure was continued to be rotated but the output would be of a reverse polarity. It can thus be appreciated that a positional signal output can be derived on conductors 15 by rotating the magnetic structure 34 around the electrodes 20 and 21. In order to provide the rotation of the magnetic structure 34, a drive wheel 44 is provided that rides in the groove 43 and the drive wheel is centered around a shaft 45. The drive wheel 44 further has a gear 46 that drives a second gear 47 around a shaft 50. It is thus apparent that a mechanical input can be provided for rotating the magnetic structure 34 and that the rotation will cause a change in signal output on conductors 15 as a function of the position of the magnetic structure with respect to the electrodes 20 and 21. One of the most important features of the present device is the fact that in generating an output signal on conductors 15 by causing a movement of the gear 47 to in turn rotate the magnetic structure 34, there is no force generated which tends to return the structure to its original position. As such, the device is unique and differs from conventional electrical rotating devices that have a back electromotive force that tends to restore the device to its original position. The output signal on conductors 15 is completely independent of anything beyond the flow of the conductive fluid and the position of the magnetic field and, without a restoring torque applied by the generating action, the device can be rotated by an input to the gear 47 without making any corrections or retaining any input force in the gear system to compensate for any back E.M.F. that would normally be generated in a conventional unit.

In order to avoid short circuiting any of the generated potential between the electrodes 20 and 21, the slots 16 and 17 are extended to points 51 and 52 which are well outside the area of the magnetic field supplied around or to the system. As such, the electrodes 20 and 21 appear to be completely isolated electrodes and if the tubing provided for the conduit 12 is made of a high-resistance material, such as a high-resistance steel, little or no shunting from one electrode to the other occurs in the present device. If need be, the present device could be constructed with independent electrodes 20 and 21 that are supported within the insulating tube 22. This could be accomplished readily by cutting out the electrodes 20 and 21 and mechanically attaching them to the tube 22 or by plating a conductive surface on an insulating tube 22. Since many modifications in the electrode structure would be possible without deviating from the present invention, the specific electrode structure has been disclosed in a broad manner.

It is obvious from a consideration of the present disclosure that many modifications, such as modifications in the electrode structure, could be undertaken and that these modifications would be well-known to ones versed in the art. As such, the applicant wishes to be limited in the scope of the present invention only to the scope of the appended claims.

I claim as my invention:

1. In a conductive fluid device for converting rotational movement into an electrical output: flow system means filled with a conductive fluid; pump means moving said conductive fluid in said system at a substantially constant rate of flow and a portion of said system being annular in cross section; electrode means oppositely disposed at said portion and including external connection means electrically connected to said electrode means; and magnetic field generating means mounted for rotation around said portion and providing a magnetic field across said portion that can be rotated with respect to said electrode means; said magnetic field interacting with said flowing fluid to generate an electrical output as a positional function of the rotation being a maximum when said field is at right angles to said electrode means and a minimum when said field is in line with said electrode means.

2. In a conductive fluid device for converting rotational movement into an electrical signal output: flow system means filled with a conductive fluid; pump means moving said conductive fluid in said system at a substantially constant rate and a portion of said system being annular in cross section; electrode means oppositely disposed at said portion and including external connection means electrically connected to said electrode means; and magnetic field generating means mounted for rotation around said portion and providing a magnetic field across said portion that can be rotated with respect to said electrode means; said magnetic field interacting with said flowing fluid to generate an electrical signal output as a positional function of the rotation being a maximum when said field is at right angles to said electrode means and a minimum when said field is in line with said electrode means.

3. In a conductive fluid device for converting rotational movement into a positional electrical signal output: flow system means filled with a conductive fluid; pump means moving said conductive fluid in said system at a substantially constant rate of flow and a portion of said system being annular in cross section; electrode means oppositely disposed at said portion and including external connection means electrically connected to said electrode means; and magnetic field generating means mounted for rotation around said portion and providing a magnetic field of substantially constant magnitude across said portion that can be rotated with respect to said electrode means; said magnetic field interacting with said flowing fluid to generate a positional electrical signal output as a function of the rotation being a maximum when said field is at right angles to said electrode means and a minimum when said field is in line with said electrode means; said electrical signal reversing in polarity as said magnetic field generating means is rotated in one direction around said electrode means.

4. In a conductive fluid device for converting rotational movement into an electrical output: flow system means filled with a conductive fluid; an electromagnetic conductive fluid pump moving said conductive fluid in said system at a substantially constant rate of flow and a portion of said system being annular in cross section; electrode means oppositely disposed at said portion and including external connection means electrically connected to said electrode means; and magnetic field generating means mounted for rotation around said portion and providing a magnetic field across said portion that can be rotated with respect to said electrode means; said magnetic field interacting with said flowing fluid to generate an electrical output as a positional function of the rotation being a maximum when said field is at right angles to said electrode means and a minimum when said field is in line with said electrode means.

5. In a conductive fluid device for converting rotational movement into an electrical output: flow system means filled with a conductive fluid; pump means moving said conductive fluid in said system at a substantially constant rate of flow and a portion of said system being annular in cross section; said annular portion being slotted at diametrically opposite sides to provide two electrodes at said portion; said electrodes having an insulative housing sealing said portion in a fluid tight manner, and including external connection means electrically connected to said electrodes; and magnetic field generating means mounted for rotation around said housing and providing a magnetic field across said portion that can be rotated with respect to said electrodes; said magnetic field interacting with said flowing fluid to generate an electrical output as a positional function of the rotation being a maximum when said field is at right angles to said electrodes and a minimum when said field is in line with said electrodes.

6. In a conductive fluid device for converting rotational movement into an electrical signal output: flow system means filled with a conductive fluid; an electromagnetic conductive fluid pump moving said conductive fluid in said system at a substantially constant rate; a portion of said system being annular in cross section and being slotted at diametrically opposite sides to provide two electrodes; said electrodes having an insulative housing sealing said portion in a fluid tight manner, and including external connection means electrically connected to said electrodes; magnetic field generating means mounted for rotation around said housing and providing a magnetic field across said portion that can be rotated with respect to said electrodes; and mechanical rotational drive means connected to said field generating means; said magnetic field interacting with said flowing fluid to generate an electrical signal output as a positional function of the rotation being a maximum when said field is at right angles to said electrodes and a minimum when said field is in line with said electrodes; said drive means rotating with said field generating means to have said mechanical drive means provide a mechanical counterpart to said electrical signal.

References Cited by the Examiner
UNITED STATES PATENTS

| | | | |
|---|---|---|---|
| 2,733,604 | 2/56 | Coutler | 310—11 |
| 2,907,207 | 10/59 | Rinia | 73—194 |
| 3,028,092 | 4/62 | Fay. | |
| 3,034,002 | 5/62 | Carlson | 310—11 |

OTHER REFERENCES

Electronics, November 27, 1959, page 82.

The Hall and Allied Phenomenon, by Leslie Campbell, pages 116 and 117.

MILTON O. HIRSHFIELD, *Primary Examiner.*